(12) United States Patent
Shirakawa et al.

(10) Patent No.: US 12,134,720 B2
(45) Date of Patent: Nov. 5, 2024

(54) ADHESIVE FILM

(71) Applicant: HITACHI CHEMICAL COMPANY, LTD., Tokyo (JP)

(72) Inventors: Tetsuyuki Shirakawa, Tokyo (JP); Shinnosuke Iwamoto, Tokyo (JP); Takahiro Fukui, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 16/957,538

(22) PCT Filed: Dec. 27, 2018

(86) PCT No.: PCT/JP2018/048285
§ 371 (c)(1),
(2) Date: Jun. 24, 2020

(87) PCT Pub. No.: WO2019/131923
PCT Pub. Date: Jul. 4, 2019

(65) Prior Publication Data
US 2021/0017427 A1   Jan. 21, 2021

(30) Foreign Application Priority Data

Dec. 28, 2017 (JP) .................................. 2017-254725

(51) Int. Cl.
| | |
|---|---|
| *C09J 9/02* | (2006.01) |
| *B32B 15/08* | (2006.01) |
| *B32B 15/20* | (2006.01) |
| *C09J 7/28* | (2018.01) |

(Continued)

(52) U.S. Cl.
CPC .................. *C09J 9/02* (2013.01); *B32B 15/08* (2013.01); *B32B 15/20* (2013.01); *C09J 7/28* (2018.01); *C09J 11/04* (2013.01); *H01B 1/22* (2013.01); *H01B 5/00* (2013.01); *B32B 2264/12* (2013.01); *B32B 2264/303* (2020.08);
(Continued)

(58) Field of Classification Search
CPC .......... C09J 2301/124; C09J 2301/1242; C09J 7/28; C09J 7/22; H01B 1/22
See application file for complete search history.

(56) References Cited

U.S. PATENT DOCUMENTS

| | | | |
|---|---|---|---|
| 6,942,824 B1 * | 9/2005 | Li ............................ | H01B 1/22 252/514 |
| 2003/0029541 A1 * | 2/2003 | Matsumora .............. | H01B 1/22 156/62.2 |

(Continued)

FOREIGN PATENT DOCUMENTS

| | | |
|---|---|---|
| CN | 101809105 A | 8/2010 |
| JP | 2002-324427 A | 11/2002 |

(Continued)

*Primary Examiner* — Samir Shah
(74) *Attorney, Agent, or Firm* — FITCH, EVEN, TABIN & FLANNERY, LLP

(57) ABSTRACT

One aspect of the present invention is an adhesive film comprising: a first adhesive layer; a metal layer; and a second adhesive layer in this order, wherein each of the first adhesive layer and the second adhesive layer comprises: a first conductive particle being a dendritic conductive particle; and a second conductive particle being a conductive particle other than the first conductive particle and the second conductive particle comprising a non-conductive core and a conductive layer provided on the core.

16 Claims, 4 Drawing Sheets

(51) Int. Cl.
  *C09J 11/04* (2006.01)
  *H01B 1/22* (2006.01)
  *H01B 5/00* (2006.01)
(52) U.S. Cl.
  CPC ..... *B32B 2307/202* (2013.01); *B32B 2405/00* (2013.01); *C09J 2301/1242* (2020.08); *C09J 2301/314* (2020.08); *C09J 2301/408* (2020.08); *C09J 2301/414* (2020.08); *C09J 2433/00* (2013.01); *C09J 2471/00* (2013.01); *C09J 2475/00* (2013.01)

(56) References Cited

U.S. PATENT DOCUMENTS

| | | | |
|---|---|---|---|
| 2008/0295955 A1* | 12/2008 | Cawse | C08J 5/249 428/411.1 |
| 2010/0209699 A1* | 8/2010 | Nakayama | H01B 1/22 428/323 |
| 2018/0273809 A1* | 9/2018 | Lin | C09J 7/401 |

FOREIGN PATENT DOCUMENTS

| | | | |
|---|---|---|---|
| JP | 2012-216843 A | 11/2012 | |
| JP | 2015-110745 A | 6/2015 | |
| JP | 2016-102204 A | 6/2016 | |
| TW | 201213490 A | 4/2012 | |
| TW | 201402772 A | 1/2014 | |
| WO | 2012/164925 A | 12/2012 | |
| WO | 2013/150907 A1 | 10/2013 | |
| WO | 2014/021037 A1 | 2/2014 | |

* cited by examiner

Fig.3 (a)
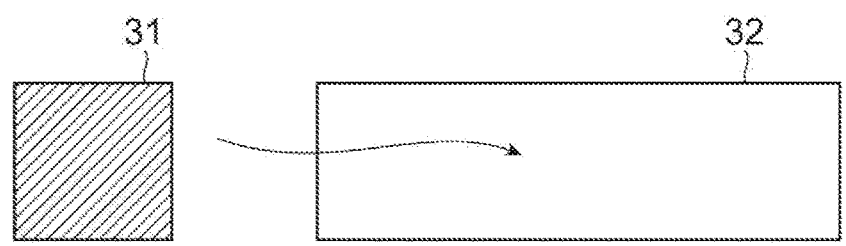
(b)
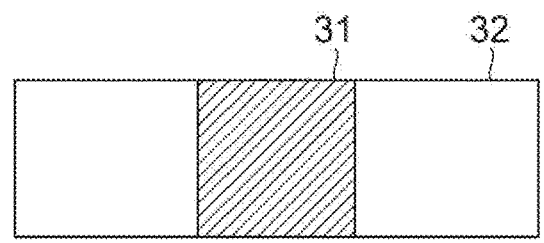
(c)
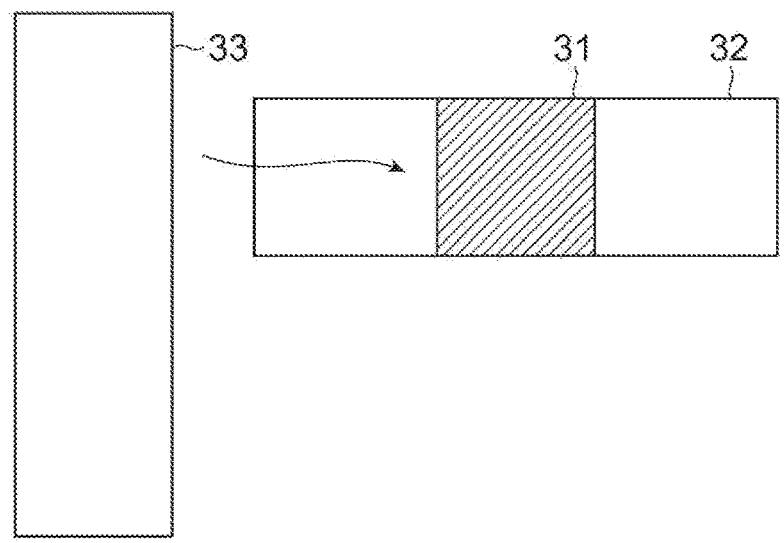
(d)
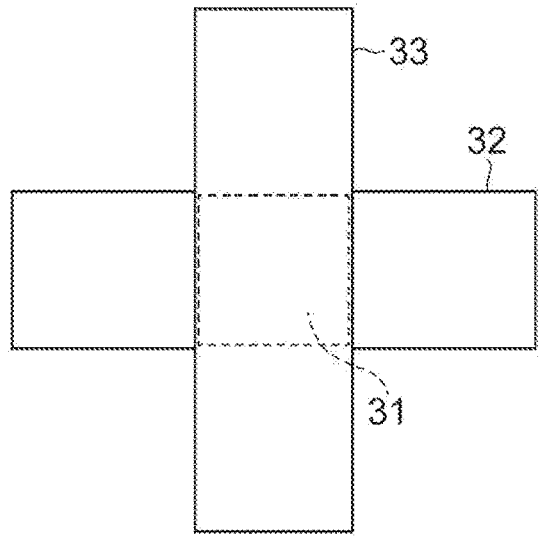

ADHESIVE FILM

CROSS-REFERENCE TO RELATED APPLICATIONS

This application is a U.S. national phase application filed under 35 U.S.C. § 371 of International Application No. PCT/JP2018/048285, filed Dec. 27, 2018, designating the United States, which claims priority from Japanese Patent Application 2017-254725, filed Dec. 28, 2017, which are hereby incorporated herein by reference in their entirety.

TECHNICAL FIELD

The present invention relates to an adhesive film.

BACKGROUND ART

In recent years, various adhesives have been used in the fields of semiconductors, liquid crystal displays, and the like for fixing electronic components, connecting circuits, and the like. In these applications, higher integration density and higher fineness of electronic components, circuits, and the like are progressed, and adhesives are required to have a higher level of performance.

An adhesive having conductive particles dispersed in the adhesive has been used in, for example, connection between a liquid crystal display and a TCP (Tape Carrier Package), connection between an FPC (Flexible Printed Circuit) and a TCP, or connection between an FPC and a printed wiring board. Such an adhesive is required to further enhance the conductivity between adherends, and reliability.

For example, Patent Literature 1 describes a conductive film comprising a conductive layer containing predetermined silver-coated dendritic copper powder particles on a substrate film, and discloses that such a conductive film can provide sufficient conductive properties without including a silver powder.

CITATION LIST

Patent Literature

Patent Literature 1: International Publication No. WO 2014/021037

SUMMARY OF INVENTION

Technical Problem

Recently, depending on the application target of the adhesive film, an adhesive film thicker than usual (for example, 40 µm or more) is required. According to the study of the present inventors, in such a case, the desired properties are not necessarily obtained by simply increasing the thickness of the conventional adhesive film. If a conventional adhesive film is simply made thick, there is room for improvement in terms of conductivity when electronic members are connected to each other at a low pressure (for example, 0.1 to 0.5 MPa). On the other hand, it is conceivable to secure the conductivity (to decrease the connection resistance to a predetermined value or less) by increasing the pressure at the time of connecting the electronic members to each other. However, in this case, the adhesive component (resin component) between the electronic members may be pushed out and flow out.

Therefore, an object of the present invention is to provide an adhesive film which is excellent in conductivity at the time of low-pressure connection and can suppress outflow of the adhesive at the time of connection.

Solution to Problem

One aspect of the present invention is an adhesive film comprising: a first adhesive layer; a metal layer; and a second adhesive layer in this order, wherein each of the first adhesive layer and the second adhesive layer comprises: a first conductive particle being a dendritic conductive particle; and a second conductive particle being a conductive particle other than the first conductive particle and the second conductive particle comprising a non-conductive core and a conductive layer provided on the core.

The conductive layer preferably comprises at least one selected from the group consisting of gold, nickel, and palladium.

The metal layer preferably has a thickness of 25 µm or more. The first adhesive layer preferably has a thickness of 30 µm or less. The second adhesive layer preferably has a thickness of 30 µm or less.

Advantageous Effects of Invention

According to the present invention, it is possible to provide an adhesive film which is excellent in conductivity at the time of low-pressure connection and can suppress outflow of the adhesive at the time of connection.

BRIEF DESCRIPTION OF DRAWINGS

FIG. 3 is a schematic view showing a method of manufacturing a mounted body for evaluation in examples.

DESCRIPTION OF EMBODIMENTS

Hereinafter, embodiments of the present invention will be described in detail with reference to the drawings as appropriate.

Figure 1:
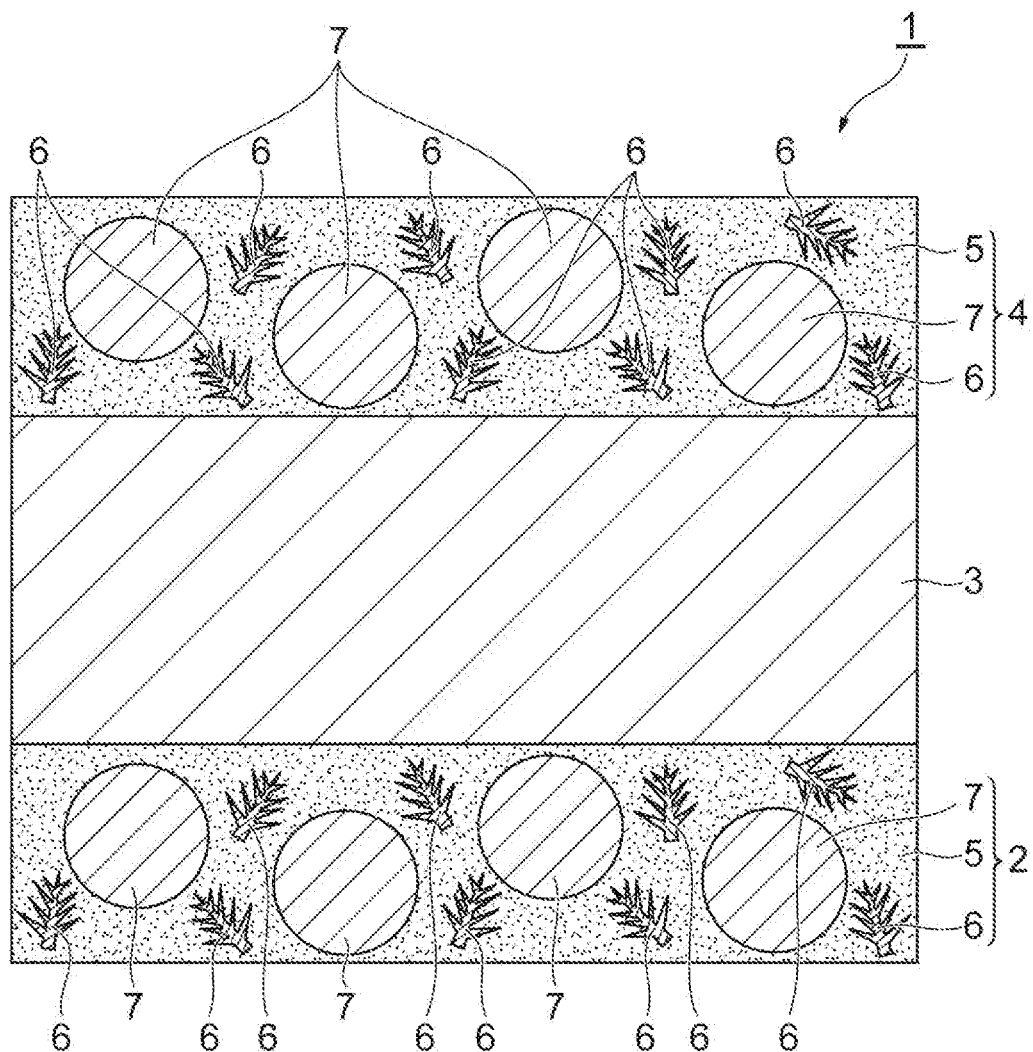
FIG. 1 is a schematic cross-sectional view showing an embodiment of an adhesive film.

FIG. 1 is a schematic cross-sectional view showing an embodiment of an adhesive film. As shown in FIG. 1, the adhesive film 1 includes a first adhesive layer 2, a metal layer 3, and a second adhesive layer 4 in this order. Each of the first adhesive layer 2 and the second adhesive layer 4 contains an adhesive component 5, first conductive particles 6 and second conductive particles 7 which are dispersed in the adhesive component 5.

Hereinafter, the first adhesive layer 2 and the second adhesive layer 4 (hereinafter, collectively referred to as "adhesive layers 2, 4") will be described. The configurations of the first adhesive layer 2 and the second adhesive layer 4 may be the same as or different from each other.

The adhesive component 5 is composed of, for example, a material exhibiting curability by heat or light, and may be an epoxy type adhesive, a radically curable adhesive, and a thermoplastic adhesive containing polyurethane, polyvinyl ester or the like. Since the adhesive component 5 is excellent in heat resistance and moisture resistance after adhesion, the adhesive component may be composed of a crosslinkable material. The epoxy type adhesive contains an epoxy resin which is a thermosetting resin as a main component. The epoxy type adhesive is preferably used from the viewpoint that the epoxy type adhesive can be cured in a short time, has good connection workability, is excellent in adhesiveness, and the like. The radically curable adhesive has properties such as being excellent in curability at a low temperature in a short time as compared with the epoxy type adhesive, and is therefore suitably used according to the application.

The epoxy type adhesive contains, for example, an epoxy resin (thermosetting material) and a curing agent, and may further contain a thermoplastic resin, a coupling agent, a filler, and the like as necessary.

Examples of the epoxy resin include a bisphenol A type epoxy resin, a bisphenol F type epoxy resin, a bisphenol S type epoxy resin, a phenol novolak type epoxy resin, a cresol novolak type epoxy resin, a bisphenol A novolak type epoxy resin, a bisphenol F novolak type epoxy resin, an alicyclic epoxy resin, a glycidyl ester type epoxy resin, a glycidyl amine type epoxy resin, a hydantoin type epoxy resin, an isocyanurate type epoxy resin, and an aliphatic chain epoxy resin. These epoxy resins may be halogenated or hydrogenated, and may have a structure in which an acryloyl group or a methacryloyl group is added to a side chain. These epoxy resins are used singly or in combinations of two or more.

The curing agent is not particularly limited as long as the curing agent can cure the epoxy resin, and examples thereof include an anionic polymerization catalyst type curing agent, a cationic polymerization catalyst type curing agent, and a polyaddition type curing agent. The curing agent is preferable to be an anionic or cationic polymerization catalyst type curing agent from the viewpoint of excellent fast curability and no need for chemical equivalent consideration.

Examples of the anionic or cationic polymerization catalyst type curing agent may include an imidazole, a hydrazide, a boron trifluoride-amine complex, an onium salt (aromatic sulfonium salt, aromatic diazonium salt, aliphatic sulfonium salt, and the like), an amine imide, a diaminomaleonitrile, a melamine and its derivatives, a polyamine salt, a dicyandiamide, and these modified products. Examples of the polyaddition type curing agent include a polyamine, a polymercaptan, a polyphenol, and an acid anhydride.

These curing agents may be latent curing agents that are microencapsulated by being coated with polymer substances such as polyurethanes and polyesters, metal thin films of nickel, copper, and the like, inorganic substances such as calcium silicate. The latent curing agent is preferable since the pot life can be extended. The curing agents are used singly or in combinations of two or more.

The content of the curing agent may be 0.05 to 20 parts by mass with respect to 100 parts by mass of the total amount of the thermosetting material and the thermoplastic resin added as necessary.

A radically curable adhesive contains, for example, a radical polymerizable material and a radical polymerization initiator (also referred to as a curing agent), and may further contain a thermoplastic resin, a coupling agent, a filler, and the like, as necessary.

As the radical polymerizable material, for example, any material having a functional group which is polymerized by radical can be used without particular limitation. Specific examples of radical polymerizable materials may include an acrylate (including corresponding methacrylate, the same applies hereinafter) compound, an acryloxy (including corresponding methacryloxy, the same applies hereinafter) compound, a maleimide compound, a citraconimide resin, and a nadimide resin. These radical polymerizable materials may be in a state of a monomer or a state of an oligomer, or may be in a mixture state of a monomer and an oligomer.

Examples of an acrylate compound include methyl acrylate, ethyl acrylate, isopropyl acrylate, isobutyl acrylate, ethylene glycol diacrylate, diethylene glycol diacrylate, trimethylolpropane triacrylate, tetramethylolmethane tetraacrylate, 2-hydroxy-1,3-diacryloxypropane, 2,2-bis[4-(acryloxymethoxy)phenyl]propane, 2,2-bis[4-(acryloxypolyethoxy)phenyl]propane, dicyclopentenyl acrylate, tricyclodecanyl acrylate, tris(acryloyloxyethyl)isocyanurate, urethane acrylate, and phosphoric acid ester diacrylate.

A radical polymerizable material such as an acrylate compound may be used together with a polymerization inhibitor such as hydroquinone and methyl ether hydroquinone as necessary. From the viewpoint of improving heat resistance, the radical polymerizable material such as an acrylate compound preferably has at least one substituent such as a dicyclopentenyl group, a tricyclodecanyl group, and a triazine ring. As the radical polymerizable material other than the acrylate compound, for example, the compound described in nternational Publication No. WO 2009/063827 can be suitably used. The radical polymerizable materials may be used singly or in combinations of two or more.

As the radical polymerization initiator, for example, any compound capable of decomposing upon heating or irradiation with light to generate radicals can be used without particular limitation. Specific examples of the radical polymerization initiator may include a peroxide compound an azo compound. These compounds are appropriately selected depending on the target connection temperature, connection time, pot life, and the like.

More specific examples of the radical polymerization initiator preferably include diacyl peroxide, peroxy dicarbonate, peroxy ester, peroxy ketal, dialkyl peroxide, hydroperoxide, and silyl peroxide. Of these initiators, peroxy ester, dialkyl peroxide, hydroperoxide, and silyl peroxide and the like are preferable, and peroxy ester is more preferable from the viewpoint of being capable of obtaining high reactivity. As these radical polymerization initiators, for example, the compound described in International Publication No. WO 2009/063827 can be suitably used. The radical polymerization initiators are used singly or in combinations of two or more.

The content of the radical polymerization initiator may be 0.1 to 10 parts by mass with respect to 100 parts by mass of the total amount of the radical polymerizable material and the thermoplastic resin added as necessary.

The thermoplastic resin which is blended as necessary in the epoxy type adhesive and the radically curable adhesive makes it easy to provide excellent film formability to the adhesive, for example. Examples of the thermoplastic resin include a phenoxy resin, a polyvinyl formal resin, a polystyrene resin, a polyvinyl butyral resin, a polyester resin, a polyamide resin, a xylene resin, a polyurethane resin, a polyester urethane resin, a phenol resin, and a terpene phenol resin. As the thermoplastic resin, for example, the compound described in International Publication No. WO 2009/063827 can be suitably used. Of the thermoplastic resins, a phenoxy resin is preferable since adhesiveness, compatibility, heat resistance, mechanical strength, and the like are excellent. The thermoplastic resins are used singly or in combinations of two or more.

The content of the thermoplastic resin may be 5 to 80 parts by mass with respect to 100 parts by mass of the total amount of the thermoplastic resin and the thermosetting material when the thermoplastic resin is added to the epoxy type adhesive. The content of the thermoplastic resin may be 5 to 80 parts by mass with respect to 100 parts by mass of the total amount of the thermoplastic resin and the radical polymerizable material when the thermoplastic resin is added to the radically curable adhesive.

Another example of the adhesive component 5 includes a thermal radical curable adhesive containing a thermoplastic resin, a radical polymerizable material in a liquid state at 30° C., and a radical polymerization initiator. The thermal radical curable adhesive has a lower viscosity than the above adhesive component. The content of the radical polymerizable material in the thermal radical curable adhesive is preferably 20 to 80 parts by mass, more preferably 30 to 80 parts by mass, and further preferably 40 to 80 parts by mass, with respect to 100 parts by mass of the total amount of the thermoplastic resin and the radical polymerizable material.

The adhesive component 5 may be an epoxy type adhesive containing a thermoplastic resin, a thermosetting material including an epoxy resin in a liquid state at 30° C., and a curing agent. In this case, the content of the epoxy resin in the epoxy type adhesive is preferably 20 to 80 parts by mass, more preferably 40 to 80 parts by mass, and further preferably 30 to 80 parts by mass, with respect to 100 parts by mass of the total amount of the thermoplastic resin and the thermosetting material.

When the adhesive film 1 is used for connecting an IC chip and a glass substrate, a flexible printed circuit (FPC), or the like, the adhesive component 5 preferably further comprises a component that exerts an effect of relaxing the internal stress, from the viewpoint of suppressing the warping of the substrate caused by the difference in linear expansion coefficient between the IC chip and the substrate. Specific examples of such components include an acrylic rubber and an elastomer component. Alternatively, the adhesive component 5 may be a radical curable adhesive as described in International Publication No. WO 98/44067.

The volume proportion of the adhesive component 5 in the adhesive layers 2, 4 may be 55% by volume or more or 65% by volume or more, and 95% by volume or less or 85% by volume or less, based on the total volume of the adhesive layers 2, 4.

The first conductive particle 6 exhibits a dendritic shape (also referred to as a dendrite shape) and comprises one main shaft and a plurality of branches that two-dimensionally or three-dimensionally branch from the main shaft. The first conductive particle 6 may be formed from a metal such as copper or silver, and may be, for example, a silver-coated copper particle in which a copper particle is coated with silver.

The first conductive particle 6 may be known one, and specifically is available, for example, as ACBY-2 (Mitsui Mining & Smelting Co., Ltd.), CE-1110 (Fukuda Metal Foil & Powder Co., Ltd.), #FSP (JX Nippon Mining & Metals Corporation), and #51-R (JX Nippon Mining & Metals Corporation). Alternatively, the first conductive particle 6 can also be manufactured by a known method (for example, the method described in the above Patent Literature 1).

The content of the first conductive particle 6 in the adhesive layers 2, 4 (the volume proportion of the first conductive particle 6 in the adhesive layers 2, 4) may be 2% by volume or more or 8% by volume or more, and 25% by volume or less or 15% by volume or less, based on the total volume of the adhesive layers 2, 4.

The second conductive particle 7 has a nonconductive core body and a conductive layer provided on the core body. The core body is formed from a nonconductive material such as glass, ceramic, and resin, and is preferably formed from resin. Examples of the resin include an acrylic resin, a styrene resin, a silicone resin, a polybutadiene resin, or copolymers of monomers constituting these resins. The average particle diameter of the core body may be, for example, 2 to 30 μm.

The conductive layer is formed from, for example, gold, silver, copper, nickel, palladium, or an alloy thereof. From the viewpoint of excellent conductivity, the conductive layer preferably comprises at least one selected from gold, nickel, and palladium, more preferably comprises gold or palladium, and further preferably comprises gold. The conductive layer is formed, for example, by plating the above metal on the core body. The thickness of the conductive layer may be, for example, 10 to 400 nm.

The average particle diameter of the second conductive particle 7 is preferably 30 μm or less, more preferably 25 μm or less, and further preferably 20 μm or less, from the viewpoint that the film can be suitably thinned. The average particle diameter of the second conductive particle 7 may be, for example, 1 μm or more. The average particle diameters of the second conductive particle 7 and the core constituting it are measured by a particle size distribution measuring apparatus (Microtrac (product name, Nikkiso Co., Ltd.)) using a laser diffraction-scattering method.

The content of the second conductive particle 7 in the adhesive layers 2, 4 (the volume proportion of the second conductive particle 7 in the adhesive film 1) may be 2% by volume or more or 5% by volume or more, and 20% by volume or less or 10% by volume or less, based on the total volume of the adhesive layers 2, 4.

The thickness of the adhesive layers 2, 4 may be, for example, 5 μm or more, 10 μm or more, or 15 μm or more, and may be 40 μm or less, 30 μm or less, or 25 μm or less.

The metal layer 3 is formed of, for example, titanium foil, stainless steel foil, nickel foil, copper foil, phosphor bronze foil, brass foil, beryllium copper foil, nickel silver foil, 36 invar foil, 42 alloy foil, PB permalloy foil, PC permalloy foil, kovar foil, inconel foil, hastelloy foil, monel foil, nichrome foil, constantan foil, manganin foil, aluminum foil, tantalum foil, molybdenum foil, niobium foil, zirconium foil, tungsten foil, gold foil, platinum foil, palladium foil, silver foil, silver solder foil, tin foil, lead foil, zinc foil, indium foil, lead-free solder foil, or iron foil.

The thickness of the metal layer 3 may be, for example, 5 μm or more, 25 μm or more, 30 μm or more, or 100 μm or more, and may be 500 μm or less, 300 μm or less, or 200 μm or less.

The thickness of the entire adhesive film 1 may be, for example, 40 μm or more, 80 μm or more, or 180 μm or more, and may be 600 μm or less, 400 μm or less, or 200 μm or less.

The adhesive film 1 is obtained, for example, by separately forming the first adhesive layer 2 and the second adhesive layer 4 and then laminating each of them on each side of the metal layer 3. Each of the first adhesive layer 2 and the second adhesive layer 4 is obtained, for example, by applying a paste adhesive composition on a resin film such as a PET (polyethylene terephthalate) film and drying it. The paste adhesive composition is obtained by, for example, heating a mixture containing the adhesive component 5, the first conductive particles 6, and the second conductive particles 7, or dissolving the mixture in a solvent. As the solvent, for example, a solvent having a boiling point of 50 to 150° C. under atmospheric pressure is used.

The adhesive film 1 can be cured, for example, by curing the adhesive component 5 by heat treatment. The heating temperature is, for example, 40 to 250° C. The heating time is, for example, 0.1 seconds to 10 hours.

The adhesive film 1 can be adhered to adherends by heating and pressuring in combination. The heating temperature is, for example, 50 to 190° C. The pressure is, for example, 0.1 to 30 MPa. These heating and pressurizing are performed, for example, in the range of 0.5 seconds to 120 seconds.

The adhesive film 1 can be used as an adhesive for adhering the same types of adherend, and can also be used as an adhesive for adhering different types of adherend (for example, adherends having different thermal expansion coefficients). The adhesive film 1 is suitably used for connecting electronic members.

Figure 2:
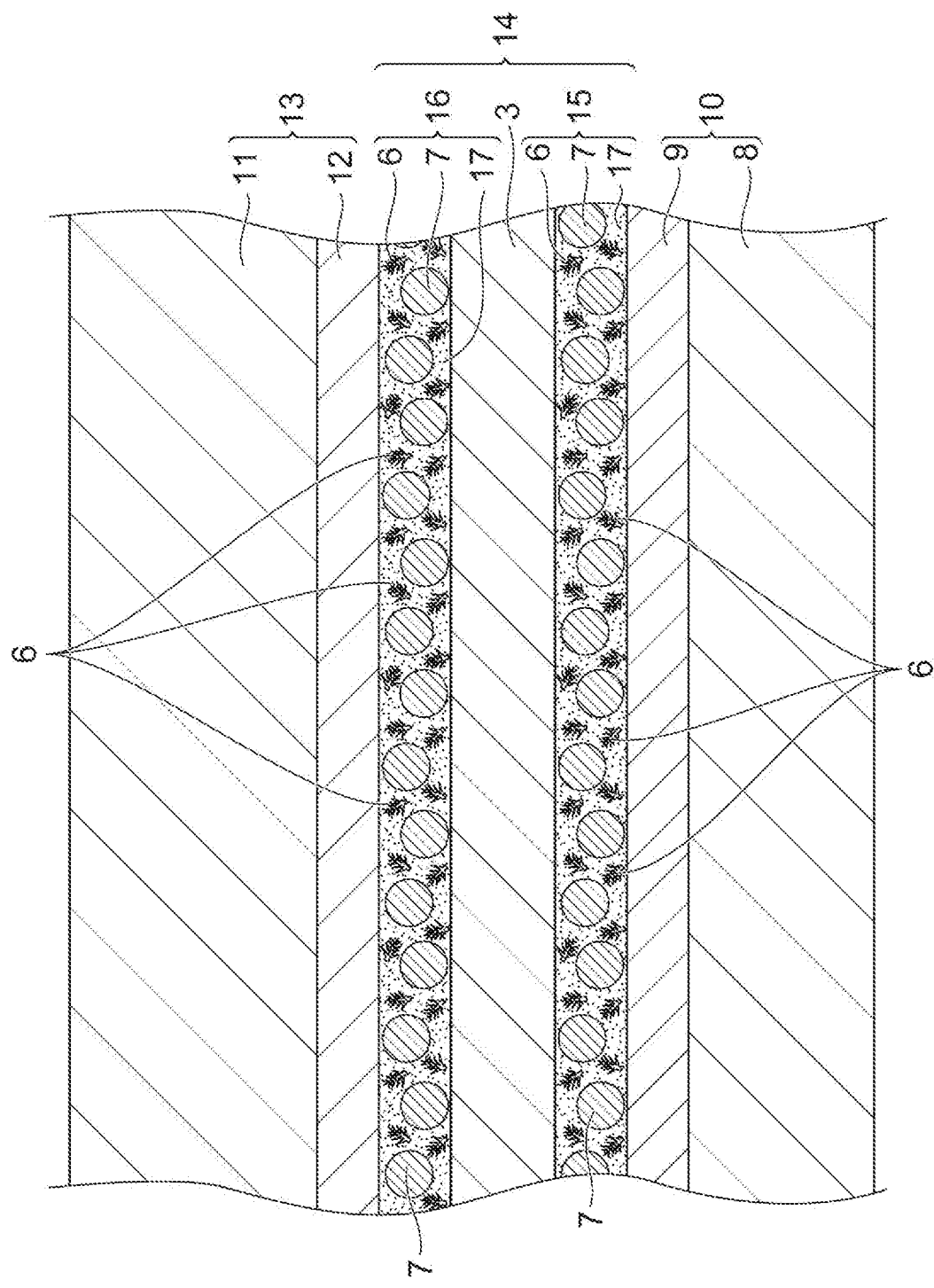
FIG. 2 is a cross-sectional diagram of a main part schematically showing an example of connection between electronic members.

FIG. 2 is a cross-sectional diagram of a main part schematically showing an example of connection between electronic members. As shown in FIG. 2, the first electronic member 10 and the second electronic member 13 are electrically connected to each other via a connecting member (circuit connecting material) 14.

The first electronic member 10 includes a first substrate 8 and a first electrode 9 formed on a main surface of the first substrate 8. The second electronic member 13 includes a second substrate 11 and a second electrode 12 formed on a main surface of the second substrate 11.

Each of the first substrate 8 and the second substrate 11 may be a substrate formed from glass, ceramic, polyimide, polycarbonate, polyester, polyethersulfone, or the like. Each of the first electrode 9 and the second electrode 12 may be an electrode formed from gold, silver, copper, tin, aluminum, ruthenium, rhodium, palladium, osmium, iridium, platinum, indium tin oxide (ITO), or the like.

The connecting member 14 includes a first cured layer 15, a metal layer 3, and a second cured layer 16 in this order from the first electronic member 10 side. The first cured layer 15 and the second cured layer 16 are cured products of the first adhesive layer 2 and the second adhesive layer 4 in the adhesive film 1 described above, respectively, and each include a cured product 17 of the adhesive component 5, first conductive particles 6 and second conductive particles 7 which are dispersed in the cured product 17. That is, the connecting member 14 is formed by curing the adhesive film 1.

In the adhesive film 1 according to the present embodiment, by providing the metal layer 3 between the first adhesive layer 2 and the second adhesive layer 4, it is possible to increase the thickness of the entire adhesive film 1 while reducing the thickness of the adhesive layers 2, 4. In addition, by using the first conductive particles 6 and the second conductive particles 7 in combination in the adhesive layers 2, 4, it is possible to achieve suitable connection between electronic members. Therefore, the adhesive film 1 is excellent in conductivity at the time of low-pressure connection and can suppress outflow of the adhesive at the time of connection even when the thickness of the adhesive film is large. Additionally, the adhesive film 1 is excellent in reliability.

EXAMPLES

Hereinafter, the present invention will be described more specifically based on Examples, but the present invention is not limited to the following Examples.

(Preparation of Solution A1)

50 g of a phenoxy resin (product name: PKHC, weight average molecular weight: 45000, manufactured by Union Carbide Corporation) was dissolved in a mixed solvent of toluene (boiling point: 110.6° C.) and ethyl acetate (boiling point: 77.1° C.) (at a mass ratio of toluene:ethyl acetate=1:1) to obtain a phenoxy resin solution having a solid content of 40% by mass. In this phenoxy resin solution, urethane acrylate (product name: UN7700, manufactured by Negami Chemical Industrial Co., Ltd.) and phosphoric acid ester dimethacrylate (product name: Light Ester P-2M, manufactured by Kyoeisha Chemical Co., Ltd.) as a radical polymerizable material, and 1,1-bis(t-hexylperoxy)-3,3,5-trimethylcyclohexane (product name: Perhexa TMH, manufactured by NOF Corporation) as a curing agent were blended at a solid mass ratio of phenoxy resin:urethane acrylate:phosphoric acid ester dimethacrylate:curing agent=10:10:3:2 to obtain a solution A1.

The dendritic conductive particles (silver-coated copper particles, manufactured by Mitsui Mining & Smelting Co., Ltd., product name: ACBY-2) were used as conductive particles B1 (the first conductive particles).

(Preparation of Conductive Particles C1)

Benzoyl peroxide as a polymerization initiator was added to a mixed solution of divinylbenzene, styrene monomer, and butyl methacrylate, and polymerization reaction was performed by heating at high speed with uniform stirring to obtain a fine particle dispersion solution. This fine particles dispersion solution was filtered and dried under reduced pressure to obtain a block body which was an aggregate of fine particles. This block body was pulverized to prepare core bodies (resin particles) having an average particle diameter of 20 μm and different crosslinking density.

A palladium catalyst (product name: MK-2605, manufactured by Muromachi Technos Co., Ltd.) was supported on the surface of the above core bodies, and the core bodies were activated with an accelerator (product name: MK-370, manufactured by Muromachi Technos Co., Ltd.). The core body was added to a mixed solution of nickel sulfate aqueous solution, sodium hypophosphite aqueous solution, and sodium tartrate aqueous solution heated to 60° C. to perform a pre-electroless plating step. The mixture was stirred for 20 minutes, and it was confirmed that hydrogen bubbling stopped. A mixed solution of nickel sulfate, sodium hypophosphite, sodium citrate, and a plating stabilizer was added and stirred until pH was stabilized, and the post-electroless plating step was performed until hydrogen bubbling stopped. Subsequently, the plating solution was filtered, the filtrate was washed with water, and then dried with a vacuum dryer at 80° C. to prepare a nickel-plated conductive particles C1 (the second conductive particles).

Example 1

<Preparation of Adhesive Film>

45 parts by volume of the conductive particle B1 and 15 parts by volume of the conductive particle C1 were dispersed in 100 parts by volume of the solution A1 to obtain a mixed solution. The obtained mixed solution was applied on a fluororesin film with a thickness of 80 μm and dried with hot air at 70° C. for 10 minutes to remove the solvent to obtain an filmy adhesive composition (first adhesive layer and second adhesive layer) with a thickness of 20 μm formed on the fluororesin film.

Next, the first adhesive layer was laminated on one surface of a copper foil (manufactured by Hanpin (Kunshan) Electronics Co., Ltd., product name: XPHOA01-025) having a thickness of 25 μm. Further, the second adhesive layer was laminated on the other surface of the copper foil to obtain an adhesive film having a thickness of 65 μm.

The properties of the obtained adhesive film when used as a connecting member were evaluated by the following procedure.

<Evaluation of Conductivity in Low-Pressure Connection>

Figure 4:
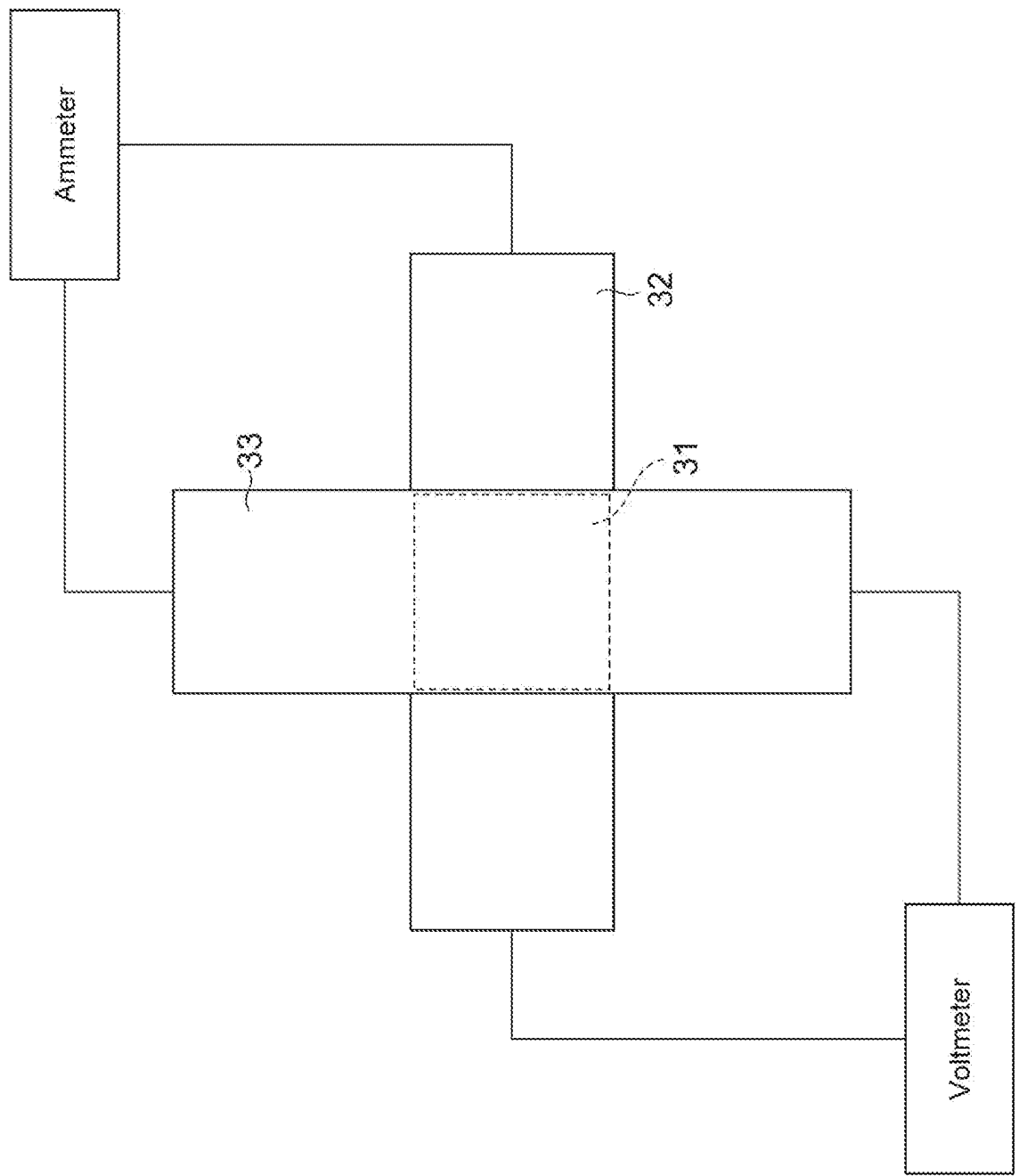
FIG. 4 is a schematic view showing a method of measuring connection resistance in examples.

As shown in FIGS. 3(a) and (b), an adhesive film 31 obtained by cutting the obtained adhesive film into 6 mm×6 mm was disposed substantially at the center of a 6 mm×50 mm copper foil 32 and bonded by heating and pressing (50° C., 0.1 MPa, 2 seconds) using BD-07 manufactured by Ohashi Seisakusho Co., Ltd. Subsequently, as shown in FIGS. 3(c) and (d), a 50 mm×6 mm aluminum foil 33 was prepared. The aluminum foil 33 was placed on the laminate of the copper foil 32 and the adhesive film 31 to cover the adhesive film 31, and the laminate was heated and pressed (150° C., 0.1 MPa, 10 seconds) by BD-07 manufactured by Ohashi Seisakusho Co., Ltd to obtain a mounted body for evaluation of conductivity in low-pressure connection. An ammeter and a voltmeter were connected to the obtained mounted body as shown in FIG. 4, and the connection resistance (initial) was measured by a four-terminal method. The results are shown in Table 1.

<Evaluation of Suppression of Outflow of Adhesive Component>

First, a pressure P (MPa) required for a mounted body to have a connection resistance (initial), which is measured in the same manner as in the above <Evaluation of Conductivity in Low-Pressure Connection>, of 0.20Ω when the mounted body was produced by the same procedure as in the above <Evaluation of Conductivity in Low-Pressure Connection> was measured. The pressure P (MPa) was a pressure when the adhesive film 31 was superimposed on the laminate of the copper foil 32 and the adhesive film 31 and heated and pressed.

Next, the outflow amount of the adhesive component was evaluated by the following procedure. The adhesive film obtained above was cut into a square of 3 mm×3 mm together with the fluororesin film to obtain an adhesive film with a fluororesin film. The adhesive film surface of the adhesive film with a fluororesin film was placed substantially at the center of a square cover glass made of Matsunami Glass Ind., Ltd. (Product No. C018181) so as to be in contact with the cover glass, and after heating and pressing (60° C., 0.1 MPa, 2 seconds) with a BD-07 manufactured by Ohashi Seisakusho Co., Ltd., the fluororesin film was peeled off. Subsequently, another identical cover glass was placed on the adhesive film, and heated and pressurized (130° C., pressure P (MPa) calculated above, 10 seconds) by BD-07 manufactured by Ohashi Seisakusho Co., Ltd. The area [A] of the fluororesin film peeled off and the area [B] of the adhesive film after heating and pressing were measured as the number of pixels by using a scanner and Photoshop (registered trademark), and the outflow amount was calculated according to the following formula:

Outflow rate(%)=([B]/[A])×100

The results are shown in Table 1.

<Evaluation of Reliability>

As shown in FIGS. 3(a) and (b), an adhesive film 31 obtained by cutting the obtained adhesive film into 6 mm×6 mm was disposed substantially at the center of a 6 mm×50 mm copper foil 32 and bonded by heating and pressing (50° C., 0.5 MPa, 2 seconds) using BD-07 manufactured by Ohashi Seisakusho Co., Ltd. Subsequently, as shown in FIGS. 3(c) and (d), a 50 mm×6 mm aluminum foil was prepared. An aluminum laminate film 33 was placed on the laminate of the copper foil 32 and the adhesive film 31 to cover the adhesive film 31, and the laminate was heated and pressed (150° C., 0.5 MPa, 10 seconds) by BD-07 manufactured by Ohashi Seisakusho Co., Ltd to obtain a mounted body for evaluation of reliability.

An ammeter and a voltmeter were connected to the obtained mounted body as shown in FIG. 4, and the connection resistance (initial) was measured by a four-terminal method. In addition, a heat cycle test in which a heat cycle of holding at −20° C. for 30 minutes, increasing the temperature to 100° C. over 10 minutes, holding at 100° C. for 30 minutes, and decreasing the temperature to −20° C. over 10 minutes was repeated 500 times was performed on the mounted body using TSA-43EL manufactured by ESPEC CORP., and then the connection resistance (after the heat cycle test) was measured in the same manner as described above. The results are shown in Table 1.

Example 2

An adhesive film was produced and evaluated in the same manner as in Example 1 except that the thickness of each of the first adhesive layer and the second adhesive layer was changed to 25 μm.

Example 3

An adhesive film was produced and evaluated in the same manner as in Example 1 except that the thickness of the metal layer was changed to 30 μm.

Comparative Example 1

An adhesive film was produced and evaluated in the same manner as in Example 1 except that the conductive particles B1 (first conductive particles) were not used in the first adhesive layer and the second adhesive layer.

Comparative Example 2

An adhesive film was produced and evaluated in the same manner as in Example 1 except that the conductive particles C1 (second conductive particles) were not used in the first adhesive layer and the second adhesive layer.

Comparative Example 3

An adhesive film was produced and evaluated in the same manner as in Example 1 except that an adhesive film consisting only of the above-mentioned adhesive layer (thickness: 65 μm) was produced without providing the metal layer.

TABLE 1

|  |  | Example 1 | Example 2 | Example 3 |
|---|---|---|---|---|
| Conductivity in Low-Pressure Connection (connection resistance/Ω) |  | 0.37 | 0.39 | 0.41 |
| Suppression of Outflow of Adhesive Component | Pressure P (MPa) | 0.22 | 0.24 | 0.28 |
|  | Outflow rate (%) | ≤0.1 | ≤0.1 | ≤0.1 |
| Reliability (connection resistance/Ω) | Initial | 0.11 | 0.12 | 0.14 |
|  | After heat cycle test | 0.42 | 0.44 | 0.48 |

|  |  | Comparative Example 1 | Comparative Example 2 | Comparative Example 3 |
|---|---|---|---|---|
| Conductivity in Low-Pressure Connection (connection resistance/Ω) |  | 5.79 | 9.25 | 5.20 |
| Suppression of Outflow of Adhesive Component | Pressure P (MPa) | 0.42 | 0.51 | 7.60 |
|  | Outflow rate (%) | 12.5 | 8.1 | 8.9 |
| Reliability (connection resistance/Ω) | Initial | 0.13 | 0.15 | 0.42 |
|  | After heat cycle test | 5.28 | 4.59 | 2.37 |

REFERENCE SIGNS LIST

1: adhesive film, 2: first adhesive layer, 3: metal layer, 4: second adhesive layer, 6: first conductive particle, 7: second conductive particle.

The invention claimed is:

1. An adhesive film comprising: a first adhesive layer; a metal layer; and a second adhesive layer in this order,
   wherein each of the first adhesive layer and the second adhesive layer comprises:
      an adhesive component containing a material exhibiting curability by heat or light and a thermoplastic resin, wherein the thermoplastic resin includes at least one of a phenoxy resin, a polyvinyl formal resin, a polystyrene resin, a polyvinyl butyral resin, a polyamide resin, a xylene resin, a polyurethane resin, and a polyester urethane resin;
      a first conductive particle being a dendritic conductive particle; and
      a second conductive particle being a conductive particle other than the first conductive particle and the second conductive particle comprising a non-conductive core and a conductive layer provided on the core, wherein the conductive layer comprises at least one selected from the group consisting of gold, nickel, and palladium, and the conductive layer has a thickness of 10 to 400 nm,
   wherein a ratio of a volume of the first conductive particle to a volume of the second conductive particle in the first and second adhesive layers is in a range of 1.25 to 12.5,
   wherein a content of the first conductive particles in the first and second adhesive layers is 2% by volume or more and 25% by volume or less based on a total volume of the first and second adhesive layers, and
   wherein a content of the second conductive particles in the first and second adhesive layers is 2% by volume or more and 20% by volume or less based on a total volume of the first and second adhesive layers.

2. The adhesive film according to claim 1, wherein the metal layer has a thickness of 25 μm or more.

3. The adhesive film according to claim 1, wherein the first adhesive layer has a thickness of 30 μm or less.

4. The adhesive film according to claim 1, wherein the second adhesive layer has a thickness of 30 μm or less.

5. The adhesive film according to claim 1, wherein each of the first adhesive layer and the second adhesive layer comprises a plurality of the first conductive particle and a plurality of the second conductive particle.

6. The adhesive film according to claim 5, wherein a content of the first conductive particles in the first and second adhesive layers is 8% by volume or more and 15% by volume or less based on a total volume of the first and second adhesive layers.

7. The adhesive film according to claim 5, wherein a content of the second conductive particles in the first and second adhesive layers is 5% by volume or more and 10% by volume or less based on a total volume of the first and second adhesive layers.

8. The adhesive film according to claim 5, wherein first conductive particles comprise copper or silver.

9. The adhesive film according to claim 5, wherein the metal layer has a thickness of 25 μm or more.

10. The adhesive film according to claim 9, wherein each of the first adhesive layer and the second adhesive layer has a thickness of 30 μm or less.

11. The adhesive film according to claim 10, wherein a thickness of the adhesive film comprising the first adhesive layer, the metal layer, and the second adhesive layer is 40 μm or more and 200 μm or less.

12. The adhesive film according to claim 5, wherein a thickness of the adhesive film comprising the first adhesive layer, the metal layer, and the second adhesive layer is 40 μm or more and 600 μm or less.

13. The adhesive film according to claim 5, wherein a thickness of the adhesive film comprising the first adhesive layer, the metal layer, and the second adhesive layer is 40 μm or more and 400 μm or less.

14. The adhesive film according to claim 1, wherein the core has an average particle diameter of 2 to 30 μm.

15. The adhesive film according to claim 1, wherein the core has an average particle diameter of 20 to 30 μm.

16. The adhesive film according to claim 1, wherein the material exhibiting curability by heat or light comprises an epoxy resin and a curing agent.

* * * * *